United States Patent
Duncan et al.

(10) Patent No.: US 7,047,536 B1
(45) Date of Patent: May 16, 2006

(54) METHOD AND APPARATUS FOR CLASSIFYING REMOTE PROCEDURE CALL TRANSPORT TRAFFIC

(75) Inventors: Robert J. Duncan, San Francisco, CA (US); Tal I. Lavian, Sunnyvale, CA (US)

(73) Assignee: Nortel Networks LTD, (CA)

( * ) Notice: Subject to any disclaimer, the term of this patent is extended or adjusted under 35 U.S.C. 154(b) by 509 days.

(21) Appl. No.: 09/752,112

(22) Filed: Dec. 29, 2000

(51) Int. Cl.
*G06F 9/44* (2006.01)

(52) U.S. Cl. ........................ 719/330; 719/328; 709/217

(58) Field of Classification Search ................ 709/328, 709/330, 226, 227–229, 217–219, 234, 235; 370/231, 235; 719/330–331, 310, 328
See application file for complete search history.

(56) References Cited

U.S. PATENT DOCUMENTS

| | | | | |
|---|---|---|---|---|
| 5,596,579 A | * | 1/1997 | Yasrebi | 709/328 |
| 5,682,534 A | * | 10/1997 | Kapoor et al. | 709/328 |
| 6,223,217 B1 | * | 4/2001 | Pettus | 709/219 |
| 6,408,342 B1 | * | 6/2002 | Moore et al. | 719/330 |
| 6,412,000 B1 | * | 6/2002 | Riddle et al. | 709/224 |
| 6,483,805 B1 | * | 11/2002 | Davies et al. | 370/235 |
| 6,487,170 B1 | * | 11/2002 | Chen et al. | 370/231 |
| 6,640,248 B1 | * | 10/2003 | Jorgensen | 709/226 |

OTHER PUBLICATIONS

Afek et al. "Remote object oriented programming with quality of service or Java's RMI over ATM" 1996, pp. 1-6.*
Dave et al. "Proxies, application interfaces, and distributed systems" 1992 IEEE, pp. 212-220.*
Stoller"Computer communications software" India University 1998, pp. 1-24.*

* cited by examiner

*Primary Examiner*—William Thomson
*Assistant Examiner*—Van H. Nguyen
(74) *Attorney, Agent, or Firm*—McGuinness & Manaras LLP

(57) ABSTRACT

A data communication network for DiffServ communications has a software library added to clients connected to a data communication network having a DiffServ-enabled edge router. When an application running on a client system wishes to make a remote procedure call to a remote server system on another network, it makes its usual call for RPC invocation using the software library. This RPC call is intercepted by a protocol layer interposed between the application layer and the underlying RPC transport code. The protocol layer detects when an RPC call is being made and can determine the identity of the calling procedure as well. The library makes a side channel communication to the edge router to provide this information to the edge router or alternative service decider, which then makes use of this data when performing DiffServ classification for packets transmitted during the course of the call.

16 Claims, 4 Drawing Sheets

METHOD AND APPARATUS FOR CLASSIFYING REMOTE PROCEDURE CALL TRANSPORT TRAFFIC

FIELD OF THE INVENTION

This invention generally relates to exchanging information over a data communications network. More particularly, the invention relates to the preferential exchange of information including remote procedure calls over a network implementing a differentiated service mechanism.

BACKGROUND OF THE INVENTION

Remote procedure calls (RPCs) are widely used in data communications, particularly in layer 5 of OSI architecture-type communication systems. An RPC is a request conforming to a protocol that a program can use to request a service from a program on another computer on the network. The client program making the request includes an API which receives calls to remote procedures from other parts of the program and passes them to a runtime program in the client. The runtime program in the client knows the format for addressing the remote server and relays the procedure requests accordingly.

Differentiated service (DiffServ) networks have become more popular in recent years. DiffServ is a network service mechanism that classifies network traffic into a number of different classes and controls the network traffic so that certain classes get precedence or service quality. The preference relationships are defined by service level agreements (SLAs) among or among and between network applications and service providers. For example, one SLA can provide that certain classes of traffic between two networks, such as important business applications, should be prioritized over other classes of traffic, such as web surfing, between the networks. As another example, an SLA can specify that a certain class of traffic from a first network to a second network should be prioritized over a certain class of traffic from the first network to a third network. DiffServ-enabled devices in a network use six-bit Differentiated Services Code Point (DSCP) labels included in IP packet headers to know how to forward the packet.

Related to the concept of DiffServ is that of edge routers. An edge router is a device for forwarding data between two networks to which it is connected. Edge routers are used to classify data flows of a DiffServ network by comparing packets in such flows with relevant SLA information stored in the router. The edge router receives packets bound for a DiffServ network and a quality of service (QoS) classifier within the edge router and applies DSCP labels according to the SLA specification. If a packet belongs to a flow with a high priority, it receives a DSCP corresponding to that high priority; if the packet belongs to a flow with a low priority, it receives a DSCP corresponding to that low priority.

The packet is then delivered to an external network for eventual transmission to its ultimate destination according to the DSCP requirements. If the DiffServ network becomes congested, the packets labeled with high priority DSCPs are more likely to successfully reach their destinations; packets labeled with low priority DSCPs might only receive best effort service. This helps to guarantee a better quality of service for higher priority flows.

RPC calls may be hard to detect by QoS classifiers in edge routers; thus, an RPC which should be given a high priority DSCP might not be properly classified, resulting in a failure in QoS requirements. This is because QoS classifiers usually screen packets in accordance with a five-tuple that includes a socket port number. RPC flows do not always use well-known port numbers. This creates a problem because priority levels which should be accorded to RPCs may then be usurped by other applications that can more easily be screened for DiffServ classification and transmission.

SUMMARY OF THE INVENTION

A data communication network for DiffServ communications in which a software library is added to clients connected to a data communication network having a DiffServ-enabled edge router. When an application running on a client system wishes to make a remote procedure call to a remote server system on another network, it makes its usual call to the RPC stub. This RPC call is intercepted by a protocol layer interposed between the application layer and the underlying RPC transport code. The protocol layer provided by the software library detects when a high priority RPC call is being made and can determine the identity of the calling procedure as well. The protocol layer also uses the library in making a side channel communication to the edge router to provide this information to the edge router, which then makes use of this data when performing DiffServ classification for packets transmitted during the course of the call.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF EMBODIMENTS OF THE INVENTION

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
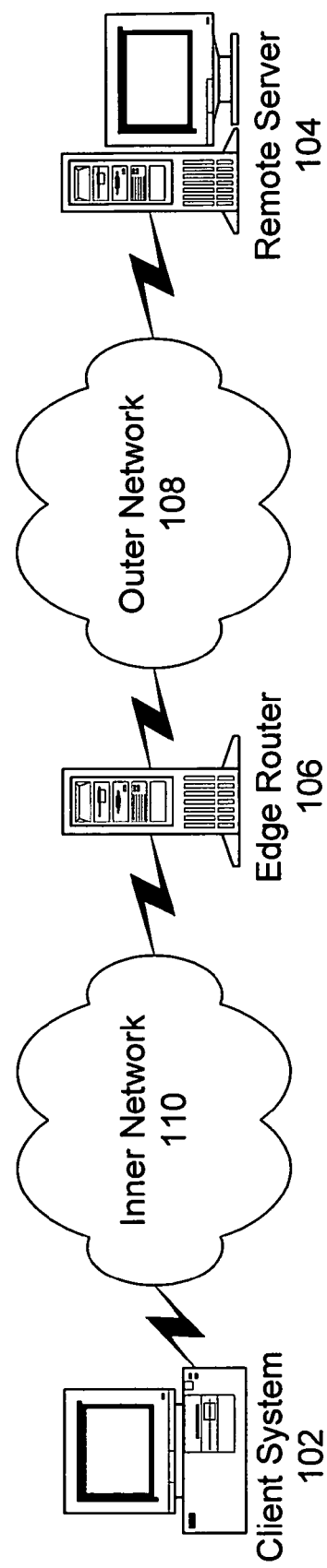
FIG. 1 shows structure of a network according to an embodiment of the present invention.

FIG. 1 illustrates the architecture of one embodiment of the present invention. As shown in FIG. 1, the architecture includes a client system 102 that has been adapted to communicate with a remote server 104 via an edge router 106 and inside and outside networks 110 and 108. Such communications between the client system 102 and the remote server 104 can include, for example, RPCs as described above.

The client system 102 can be, for example, a workstation such as a PC, Macintosh, Unix, Linux or Sparc workstation. The server 104 can be, for example, a PC, Macintosh, Unix, Linux or Sparc workstation, mainframe, minicomputer like the IBM AS-400, or any other appropriate server hardware. The software on the server can be any appropriate server application, or any application running on an application server like IBM's San Francisco, Sun's Net Dynamics, Bluestone, BEA or any appropriate application server. Database servers that can run on these hardware servers can be Oracle, IBM's DB2, an object repository (server) or other appropriate system. The inside network 110 can be, for example, a LAN or other network connecting the client system 102 and router 106. The edge router 106 can be, for example, a Nortel Networks Passport 8600 router, Cisco System Catalyst 6500 or other router which includes DiffServ or other network control functionality like RSVP, COPS, COPS-PR, MPLS, IntServ or similar functionality. The outside network 108 can be a LAN, MAN, WAN or the Internet, for example. It further preferably includes one or more DiffServ-enabled devices. Specifically, at least part of the path between the client 102 and the remote server 104 is managed using differentiated services.

Preferably, the router 106 is at the edge of the inside network 110, but this is not necessary. What is desirable is that this is the first or closest DiffServ-classifying router in the DiffServ-controlled portion of the path between the client 102 and the server 104. Typically, this will be at the edge of the inside network 110. The invention may be practiced in a router within the outside network 108; however, its benefit (as well as the benefit of any DiffServ-capable QoS service) will be less there because part of the transit path of RPC traffic will be non-DiffServ prioritized.

The present invention is preferably practiced instead of the aforementioned conventional DiffServ capabilities known in the art. Alternatively, the edge router 106 preferably has existing DiffServ-classifying capability in accordance with SLAs or it has been upgraded with dynamic DiffServ-classifying capability, and the present invention is practiced in addition to these conventional DiffServ classifying capabilities in accordance with SLAs.

Generally, when operating in accordance with the invention, a client application in the client system 102 initiates an RPC connection with the remote server 104. The present invention, preferably implemented as software within the client system 102, detects the attempt to initiate an RPC connection using a special software library described below and collects RPC flow information relating to the connection (e.g., a five-tuple including the sender and receiver MAC and IP addresses, the sender and receiver MAC and IP port numbers, and the TCP protocol type for the connection) for transmission via a side channel to the edge router 106 (it should be noted that the invention does not require all of the above information for implementation, and may be practiced with a subset thereof, or other equivalent parameters). Other arrangements using different information sets may be usable; however, this arrangement allows the system to distinguish specific traffic. This is part of the interaction between the application and the routers 106. The routers 106 thus have a specific way to identify specific traffic and give the right service to it.

A DiffServ classifier 408 (see FIG. 4) in the edge router 106 becomes aware of the received flow information and assigns the RPC flow a QoS level in accordance with the SLAs. Thereafter, when communications between the client system 102 and the remote server 104 associated with the RPC flow are received by the edge router 106, they are marked with the appropriate DiffServ labels for the desired QoS by the edge router 106, e.g., by various filters in the edge router 106, and are forwarded through the outside network 108. For example, the old ToS byte nay be used as a DSField byte marking the packet.

Although only one client system 102 and edge router 106 are shown, it should be noted that the remote server 104 preferably includes functionality for communicating with many client systems 102 via the same or many different edge routers 106. These may be a mix of devices practicing the invention, DiffServ-capable devices not practicing the invention, and non-DiffServ capable devices. Likewise, the client system 102 can include functionality for communicating with many different edge routers 106 and servers 104. Such additional functionality is apparent to those skilled in the art and more detailed descriptions thereof are not necessary for an understanding of the present invention.

It should be further noted that the remote server 104 and its associated edge router or similar device (not shown) may include similar functionality as described herein with reference to the client system 102 and the edge router 106 for dynamically assigning QoS to RPC return flows from the server 104 to the client system 102. Alternatively, the client system 102 may include functionality for also informing the remote server's associated edge router of the RPC flow information for dynamic QoS assignment.

It should be even further noted that, although the present invention is described herein with reference to an exemplary implementation in a DiffServ-capable network, the present invention is not limited to this example. Rather, the present invention is applicable to other existing or emerging standards for providing differentiated services or QoS for different types of flows or classes of network traffic, such as IntServ/RSVP, COPS, COPS-PR, MPLS, IEEE 801.2(p) and IEEE 801.2(q). Moreover, where an outside network 108 supports more than one type of differentiated services, the client system 102 may include functionality for dynamically adjusting the level of service for RPC flows in accordance with these multiple types.

Figure 2:
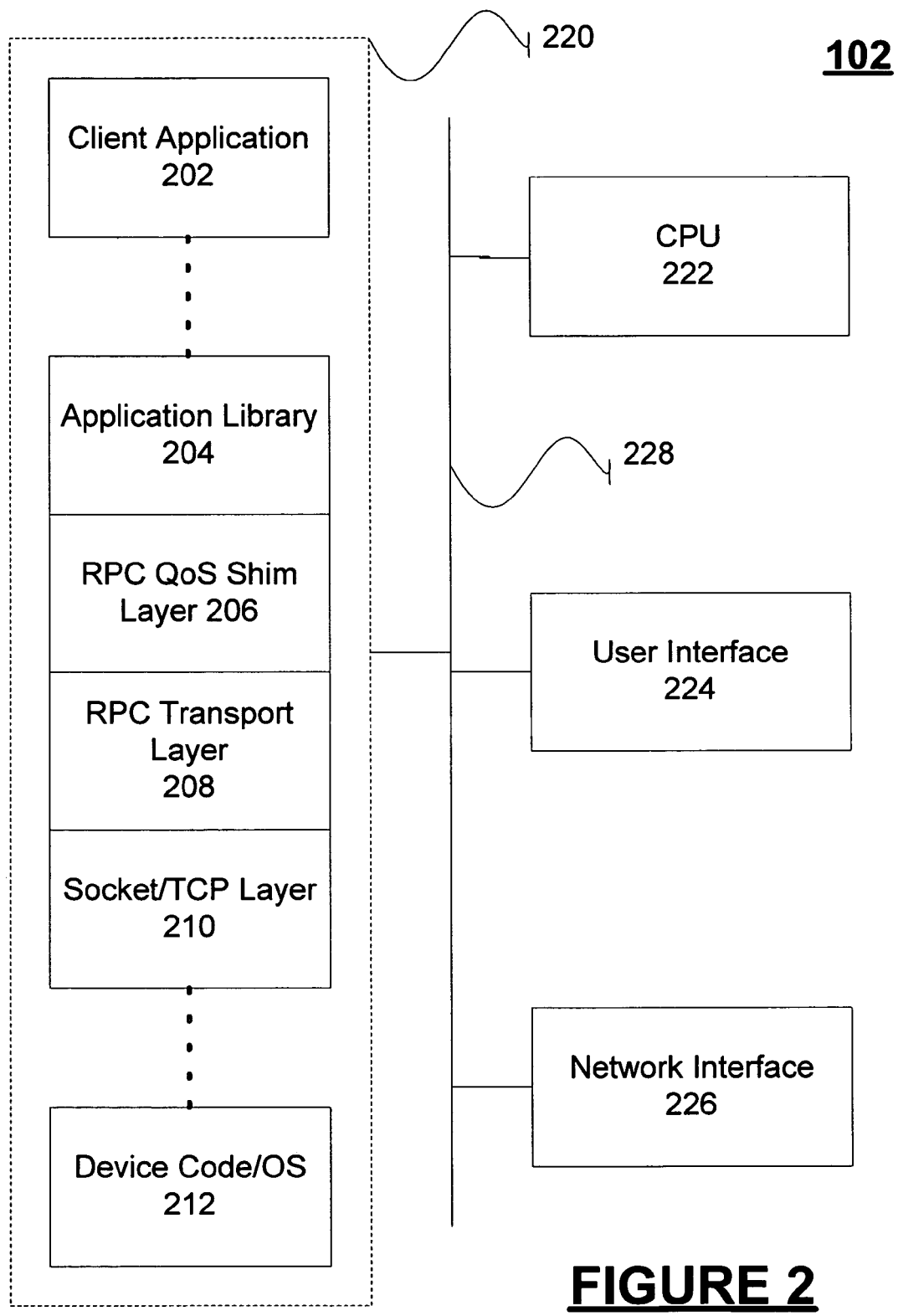
FIG. 2 shows structure of a client system according to an embodiment of the present invention.

FIG. 2 illustrates an example client system 102 in accordance with one embodiment of the present invention. As shown in this example implementation, the client system 102 includes software modules 202 to 212 that can be provided as one or more executable files loaded in a dynamic memory 220 and executed by a central processing unit 222 in the client system 102. The client system 102 further includes a user interface 224 that allows an associated user such as a network manager to initiate an RPC connection and a network interface 226 through which the client system 102 can communicate via the inside network 110 with the edge router 106 and the outside network 108, as well as a bus 228 that allows communications between the memory 220, the CPU 222, the user interface 224 and the network interface 226.

As shown in FIG. 2, the software loaded in the memory 220 during operation of the client system 102 includes a client application 202 that establishes connections with remote objects on the remote server 104 for the purposes of making RPCs, for example. As indicated in the Figure, the client application 202 may communicate with an application library 204 either directly or through one or more additional software layers (not shown).

The application library 204 is typically one or more APIs that are designed to communicate with an RPC transport layer 208 so the client application need not be aware of the implementation details of the RPC transport layer. The library 204 can include, for example, SAP methods, Oracle database methods and the like, that implement or initiate RPCs on the remote server 104. As is known in the art, the library 204 may be provided by the same entity that maintains the remote server 104 to enable the client system 102 to establish and maintain connections with that server.

The RPC transport layer 208 further communicates with a socket/TCP layer 210 which may even further communicate with other networking protocol layers and device-level layers such as a device operating system and device-level APIs. These layers are device-specific and are generally specifically written for the device and operating system 212 (e.g., Solaris, Windows) of the client system 102. Further detailed descriptions thereof are not necessary for an understanding of the present invention.

In accordance with the invention, as shown in FIG. 2, the software load further includes an RPC QoS shim layer 206. Generally speaking, the shim layer 206 detects when calls to the RPC transport layer 208 have been made (the shim layer 206 preferably presents a duplicate or equivalent API to calling layers as described below), determines who made the call and the socket used by the RPC by examining headers of packets used in the call, and signals the classifier in the edge router of the five-tuple of the RPC flow. It then may pass the traffic on to the RPC transport layer 208 for conventional processing.

It should be noted that the client system 102 can include additional software to that shown in FIG. 2, and that certain of the software layers can include functionality for communicating with other software layers not shown in FIG. 2, as well as additional functionality and other software not necessary for practicing the present invention.

It should be further noted that the RPC QoS shim layer 206 can be integrated together with, or (for exclusive DiffServ operation) entirely replace, the RPC transport layer 208. Many other combinations or divisions between the functionalities of the RPC QoS shim layer 206 and other software layers are possible, as will become apparent to those skilled in the art after being taught by the present specification.

Figure 3:
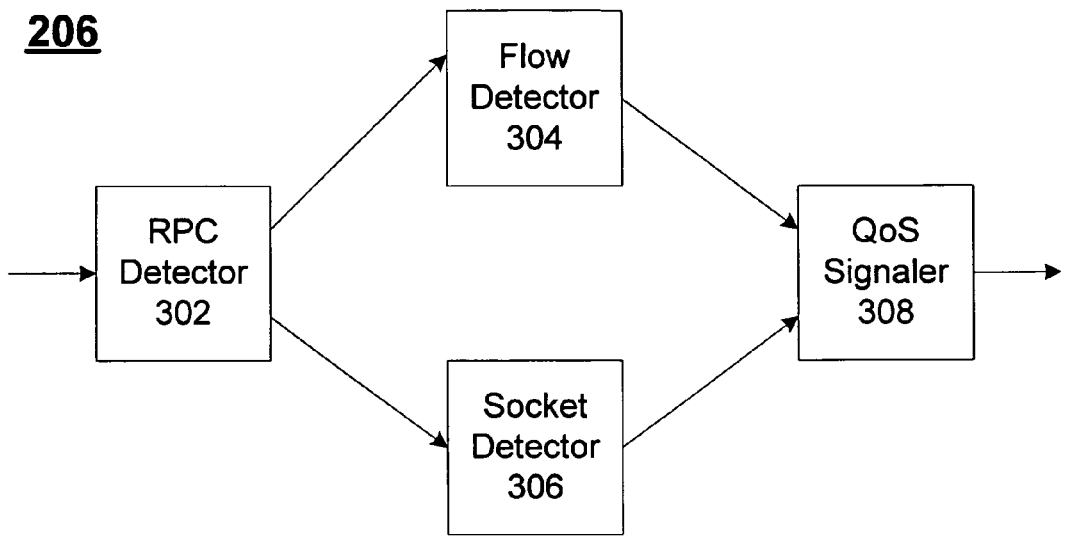
FIG. 3 shows structure in an RPC QoS shim layer according to an embodiment of the present invention.

FIG. 3 is a functional block diagram illustrating an example of functionality within the RPC QoS shim layer 206 in accordance with one embodiment of the present invention. As shown, it includes an RPC detector 302, a flow detector 304, a socket detector 306, and a QoS signaler 308. Although shown separately for clarity, it should be appreciated that the functionalities of each element can be combined together and divided apart in various ways.

The RPC detector 302 detects RPC calls by client applications 202. In one example of the invention, the RPC QoS shim layer 206 can do this by providing shell modules having the same name as the APIs of the RPC transport layer 208. Accordingly, rather than making an API call in the RPC transport layer 208, the application library 204 calls the module having the same name in the RPC QoS layer 206, which then calls the appropriate API in the RPC transport layer 208, in addition to performing detection processing.

It should be noted that as seen above, the presence and operation of this embodiment may be transparent to the application library 204—it simply makes the API calls and does not know (or care) that they are received by the RPC shim 206 rather than the RPC transport layer 208.

The flow detector 304 determines the flow information (e.g., the MAC and IP addresses of the client system 102 and the remote server 104) associated with the RPC connection. It does this using a modification of the RPC API implementation and parameters in the RPC call.

The socket detector 306 determines the socket information (e.g., TCP socket number) for the RPC flow. It does this by making the appropriate library call to open a TCP socket, thus trapping the socket number returned.

The QoS signaler 308 receives the detected flow information from the flow detector 304 and socket information from the socket detector 306 and sets up a side channel through which to forward the information to the edge router 106. A side channel, as used herein, includes, e.g., an additional socket communication using a protocol such as TCP/HTTP such as in the following CGI example. For example, the QoS signaler 308 may post a CGI script over the HTTP protocol having the flow information as parameters to the edge router 106, and the CGI script will cause the corresponding dynamic QoS assignment functionality to be executed on the edge router 106. This can be done by a user-defined QoS configuration that provides routing information including edge routers, as will be apparent to those skilled in the art.

Figure 4:
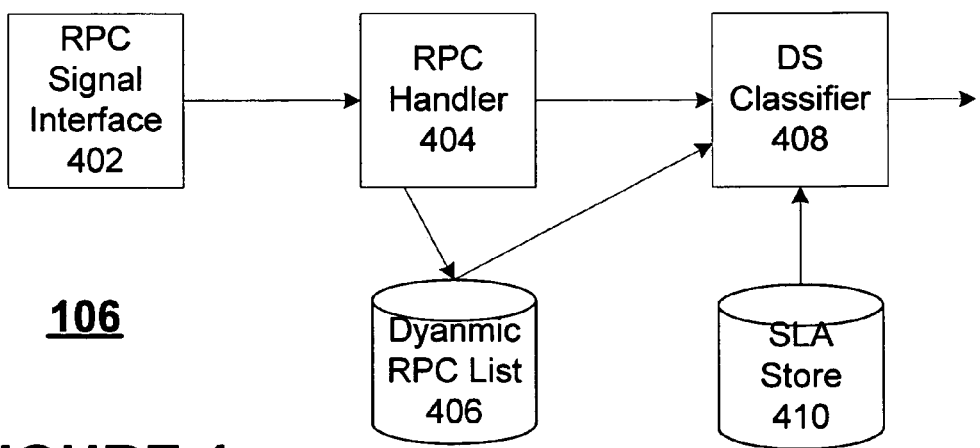
FIG. 4 shows structure in an edge router according to an embodiment of the present invention.

FIG. 4 illustrates an example of the RPC QoS functionality in the edge router 106 in accordance with one embodiment of the present invention. As shown, it includes an RPC signal interface 402, an RPC handler 404, a dynamic RPC list 406, a DiffServ classifier 408 and a service level agreement (SLA) store 410. Although shown separately for clarity, it should be appreciated that the functionalities of certain elements can be combined together and divided apart in various ways.

The RPC signal interface 402 communicates with the QoS signaler 308 in the client system 102. For example, the RPC signal interface 402 can be the portion of a CGI script (written in PERL, C/C++, etc.) that executes when the QoS signaler 308 posts information corresponding to the script to the edge router 106. The RPC signal interface 402 may extract the flow information from the CGI script parameters. It should be apparent that the edge router 106 may include additional functionality for communicating with the QoS signaler 308 using known protocols such as HTTP, for example, and for launching CGI applications in response to information posted to the edge router 106.

The RPC handler 404 receives the RPC flow information from the RPC signal interface 402 and adds it to a dynamic RPC list 406. The dynamic RPC list 406 contains entries listing RPC flows that have been requested through the edge router 106. In one example of the invention, the RPC handler 404 includes functionality for aging out entries in the list 406 using a least-recently-used (LRU) algorithm or the like. Alternatively, the RPC handler 404 simply overwrites the oldest entry when the list becomes full and new flow information is received.

The SLA store 410 contains QoS settings among and between networks in accordance with service level agreements (SLAs). These are the static and pre-defined flows for conventional DiffServ treatment. In one example of the invention, the dynamic RPC list 406 and the SLA store 410 are provided as separate memories, and are shown as such for clarity. However, this is not necessary. They can be provided together in one memory area, with a static portion (locations not addressed during operation by the RPC handler 404, corresponding to the SLAs in SLA store 410) and a dynamic portion (locations addressable during operation by the RPC handler 404 to update with RPC flow information, corresponding to the dynamic RPC list 406).

The DiffServ classifier 408 accesses the flow information in the dynamic RPC list 406 and the SLA store 410 and compares the information therein with flow information detected from packet headers of traffic flowing to the outside network 108 through the edge router 106. If the flow information in the traffic headers matches the stored flow information (e.g., the five-tuple of source and destination IP addresses, source and destination MAC addresses, and socket or port number), the packets are marked with a QoS label in accordance with the QoS agreed to for that flow. The classifier 408 can be implemented by adapting a conventional DiffServ classifier with the additional functionality of comparing packet headers with dynamic RPC flow information stored in the dynamic RPC list 406. It should be apparent, however, that such adaptation can be minimal or unnecessary if the flow information in the dynamic RPC list 406 and the SLA store 410 are provided together in a single contiguous memory location.

It should be noted that the edge router 106 preferably further includes functionality for authenticating requests for dynamic classification of RPC flows. This functionality can include encryption and signature techniques. Such additional functionality that presently exists is well understood by those skilled in the art and the details thereof are not necessary for an understanding of the present invention.

Moreover, the edge router 106 can also include a conventional packet processing and forwarding architecture, a further description of which is not necessary for an understanding of the present invention.

Figure 5:
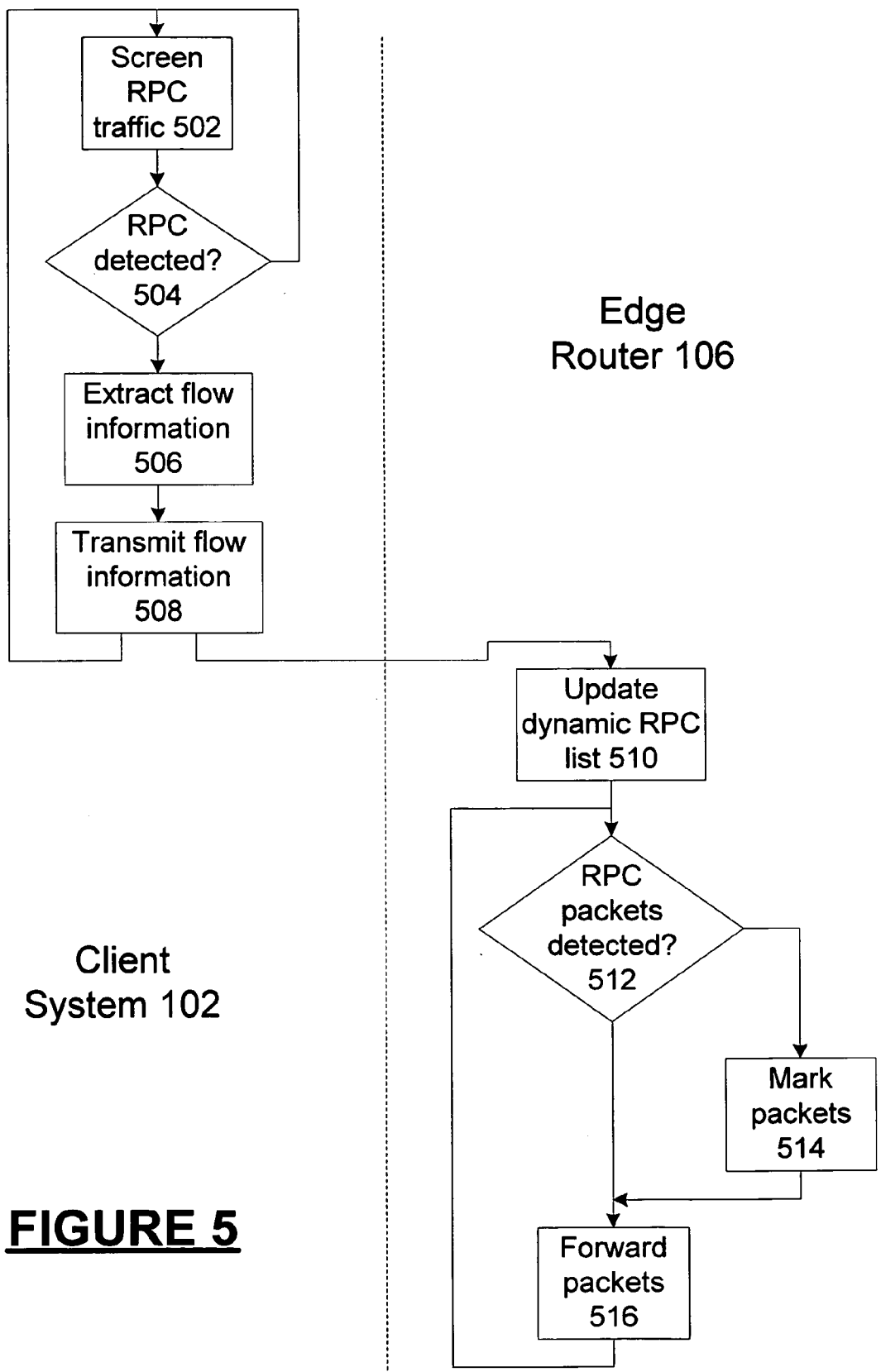
FIG. 5 shows operation of an embodiment of the present invention.

FIG. 5 is a flowchart illustrating an example method for classifying an RPC flow in accordance with one embodiment of the present invention.

As shown in FIG. 5, processing begins in the client system 102 in S502 where requests for access to an RPC transport layer are made, for example, by application library software. If an RPC connection has been initiated (determined in S504), processing advances to S506, where the flow information associated with the RPC connection is detected. In S508, the detected flow information is transmitted upstream to the edge router 106 for dynamic QoS classification, and the client system 102 processing returns to detecting a new RPC connection in S502.

Processing continues in the edge router 106 in S510, where the received RPC flow information is used to update a dynamic RPC flow list. Processing continues to S512 where all incoming packets bound for the outside network 108 are screened at the edge router 106. If a packet belongs to an RPC flow (determined in S512), it is marked with a DiffServ label in accordance with the desired QoS for RPC flows in S514. All packets, whether marked with DiffServ labels or not, are then forwarded along to the outside network 108 in S516 and the process of screening packets at the edge router 106 continues at S510.

The methods and implementing apparatus of the present invention have been described in connection with the preferred embodiments as disclosed herein. Although exemplary embodiments of the present invention have been shown and described in detail herein, along with certain variants thereof, other varied embodiments which incorporate the teachings of the invention may easily be constructed by those skilled in the art.

For example, the above-described embodiment may be implemented in a number of ways, including the use of dedicated hardware, a combination of dedicated hardware and programmed special purpose processors, programmed general purpose processors or software, and the like.

Accordingly, the present invention is not intended to be limited to the specific form set forth herein, but on the contrary, it is intended to cover such alternatives, modifications, and equivalents, as can be reasonably included within the spirit and scope of the invention. In other instances, well known structures are not shown in detail but can readily constructed by those skilled in the art.

What is claimed is:

1. A method for classifying a remote procedure call from a client system in a first network that initiates connections to a remote server in a second network via a classifying edge router using a client and underlying remote procedure call transport code, the method comprising:
   detecting when a connection for the remote procedure call is created;
   using a side channel to communicate flow information associated with the detected connection to the classifying edge router, the flow information including a port number associated with the communication, the flow information provided to enable the classifying edge router to assign a quality of service classifier to the remote procedure call for appropriately prioritized transfer to the second network; and
   incorporating the flow information into a differentiated services classification subsystem of the classifying edge router by associating the equality of service level to the detected connection; and
   wherein the detecting comprises:
     providing an Application Programming Interface (API) to calling applications;
     detecting when the applications call the API; and
     executing a remote procedure routine based on a call by an application, the remote procedure routine including forwarding the flow information to the classifying edge router via the side channel; and
   wherein:
     the executing comprises accessing a remote procedure call API; and
     the API provided to the calling applications includes functionality duplicative of remote procedure call API functionality.

2. The method of claim 1, wherein:
   the executing comprises accessing a remote procedure call API; and the API provided to the calling applications presents an interface duplicative of the remote procedure call API to the calling applications.

3. The method of claim 1, further comprising:
   obtaining flow information from an application call to the API; and
   providing the flow information to the classifying edge router via the side channel.

4. The method of claim 3, wherein the flow information includes a five-tuple including sender and receiver Media Access Control (MAC) and Internet Protocol (IP) addresses, sender and receiver MAC and IP port numbers, and Transmission Control Protocol (TCP) protocol type for the connection.

5. The method of claim 1, wherein the side channel is implemented as Common Gateway Interface (CGI) script from the client to the classifying edge router.

6. The method of claim 1, wherein the flow information includes a five-tuple including sender and receiver Media Access Control (MAC) and Internet Protocol (IP) addresses, sender and receiver MAC and IP port numbers, and Transmission Control Protocol (TCP) protocol type for the connection.

7. The method of claim 1, wherein incorporating includes:
using the flow information to determine a differentiated services classification for the connection; and
marking traffic delivered to the connection by the classifying router based on the classification.

8. The method claim 1, further comprising:
detecting the identify of the client making the remote procedure call, the flow information further containing this detected identify.

9. An apparatus for classifying a remote procedure call from a client system in a first network that initiates connections to a remote server in a second network via a classifying edge router using a client and underlying remote procedure call transport code, the apparatus comprising:
a module configured to detect when a connection for the remote procedure call is created;
a module configured to use a side channel to communicate flow information associated with the detected connection to the classifying edge router, wherein the flow information includes a port number associated with the remote procedure call, the flow information provided to enable the classifying edge router to assign a quality of service classifier to the remote procedure call for appropriately prioritized transfer to the second network; and
a module configured to incorporate the flow information into a differentiated services classification subsystem of the classifying edge router by associating the equality of service level to the detected connection; and
wherein the detecting module is further configured to:
provide an Application Programming Interface (API) to calling applications;
detect when the applications call the API; and
execute a remote procedure routine based on a call by an application, the remote procedure routine including forwarding the flow information to the classifying edge router via the side channel; and
wherein:
the detecting module is further configured to access a remote procedure call API; and
the API provided to the calling applications includes functionality duplicative of remote procedure call API functionality.

10. The apparatus of claim 9, wherein the detecting module is further configured to access a remote procedure call API; and the API provided to the calling applications presents an interface duplicative of the remote procedure call API to the calling applications.

11. The apparatus of claim 9, wherein the side channel module is further configured to:
obtain flow information from an application call to the API; and
provide the flow information to the classifying edge router via the side channel.

12. The apparatus of claim 11, wherein the flow information includes a five-tuple including sender and receiver Media Access Control (MAC) and Internet Protocol (IP) addresses, sender and receiver MAC and IP port numbers, and Transmission Control Protocol (TCP) protocol type for the connection.

13. The apparatus of claim 9, wherein the side channel is implemented as a Common Gateway Interface (CGI) script from the client to the classifying edge router.

14. The apparatus of claim 9, wherein the flow information includes a five-tuple including sender and receiver Media Access Control (MAC) and Internet Protocol (IP) addresses, sender and receiver MAC and IP port numbers, and Transmission Control Protocol (TCP) protocol type for the connection.

15. The apparatus of claim 9, wherein the incorporating module is further configured to:
use the flow information to determine a differentiated services classification for the connection; and
mark traffic delivered to the connection by the classifying edge router based on the classification.

16. The apparatus of claim 9, wherein the side channel module is further configured to detect the identity of the client making the remote procedure call, the flow information further containing this detected identity.

* * * * *